United States Patent
Nam

(10) Patent No.: US 11,149,554 B2
(45) Date of Patent: Oct. 19, 2021

(54) STRUCTURE FOR IMPROVING PERFORMANCE OF COOLING BLADE, AND BLADE AND GAS TURBINE HAVING THE SAME

(71) Applicant: DOOSAN HEAVY INDUSTRIES & CONSTRUCTION CO., LTD., Changwon-si (KR)

(72) Inventor: Gyeong Mo Nam, Yongin-si (KR)

(*) Notice: Subject to any disclaimer, the term of this patent is extended or adjusted under 35 U.S.C. 154(b) by 105 days.

(21) Appl. No.: 16/683,197

(22) Filed: Nov. 13, 2019

(65) Prior Publication Data
US 2020/0149406 A1 May 14, 2020

(30) Foreign Application Priority Data
Nov. 14, 2018 (KR) .................. 10-2018-0139737

(51) Int. Cl.
*F01D 5/18* (2006.01)
*F02C 7/12* (2006.01)
*F02C 3/04* (2006.01)

(52) U.S. Cl.
CPC ............... *F01D 5/18* (2013.01); *F02C 3/04* (2013.01); *F02C 7/12* (2013.01); *F05D 2220/32* (2013.01);
(Continued)

(58) Field of Classification Search
CPC . F01D 5/18; F01D 9/023; F01D 5/186; F01D 9/065; F02C 7/12; F02C 3/04; F05D 2260/22141; F05D 2240/30; F05D 2240/35; F05D 2220/32; F05D 2260/2212; F05D 2240/126; F05D 2250/13; F05D 2250/11;
(Continued)

(56) References Cited

U.S. PATENT DOCUMENTS

2013/0205793 A1* 8/2013 Xu ................ F01D 5/186
60/754
2016/0201474 A1* 7/2016 Slavens ............ F04D 29/083
60/806

FOREIGN PATENT DOCUMENTS

| CN | 102261281 A | * | 11/2011 | ............. F01D 5/186 |
| JP | H10-089005 A | | 4/1998 | |
| JP | H1089005 A | * | 4/1998 | ............. F01D 9/065 |

OTHER PUBLICATIONS

A Korean Office Action dated Jan. 13, 2020 in connection with Korean Patent Application No. 10-2018-0139737 which corresponds to the above-referenced U.S. application.

* cited by examiner

*Primary Examiner* — Jacob M Amick
*Assistant Examiner* — Charles J Brauch
(74) *Attorney, Agent, or Firm* — Harvest IP Law, LLP

(57) ABSTRACT

A structure for improving performance of cooling a blade of a gas turbine is provided in which interaction vortexes are generated between working fluid flowing along a surface of the blade and cooling fluid discharged onto the surface from an internal flow passage of the blade. The blade includes a surface structure formed by a gas hole having an outlet communicating with the surface of the blade to discharge the cooling fluid; and a vortex relief generator disposed so as to protrude from an inner periphery of the outlet and configured to generate counter vortexes having directionality opposite to the interaction vortexes so that the interaction vortexes are relieved by collision with the counter vortexes. The vortex relief generator includes a pair of opposing fins disposed in a path of the cooling fluid, each of which has a first surface to change a flow direction of the cooling fluid.

7 Claims, 20 Drawing Sheets

(52) U.S. Cl.
CPC ...... *F05D 2240/30* (2013.01); *F05D 2240/35* (2013.01); *F05D 2260/22141* (2013.01)

(58) Field of Classification Search
CPC ........... F05D 2250/12; F05D 2260/202; F05D 2240/11; F05D 2240/81; Y02T 50/60; F02K 1/822
See application file for complete search history.

[FIG. 1]
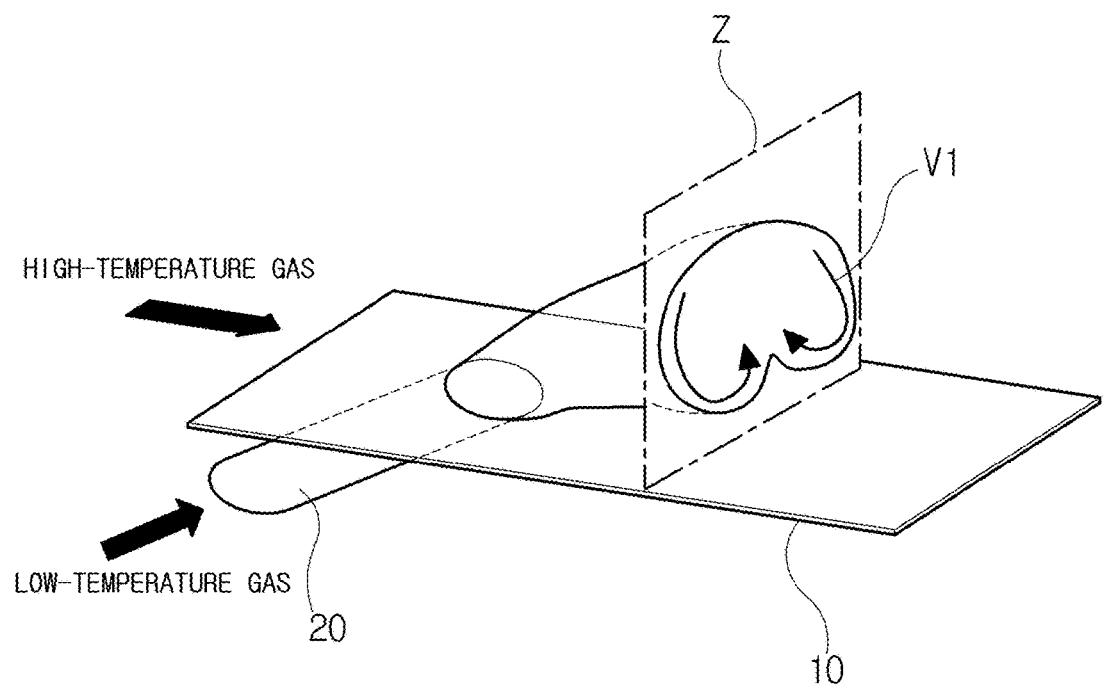

[FIG. 2A]
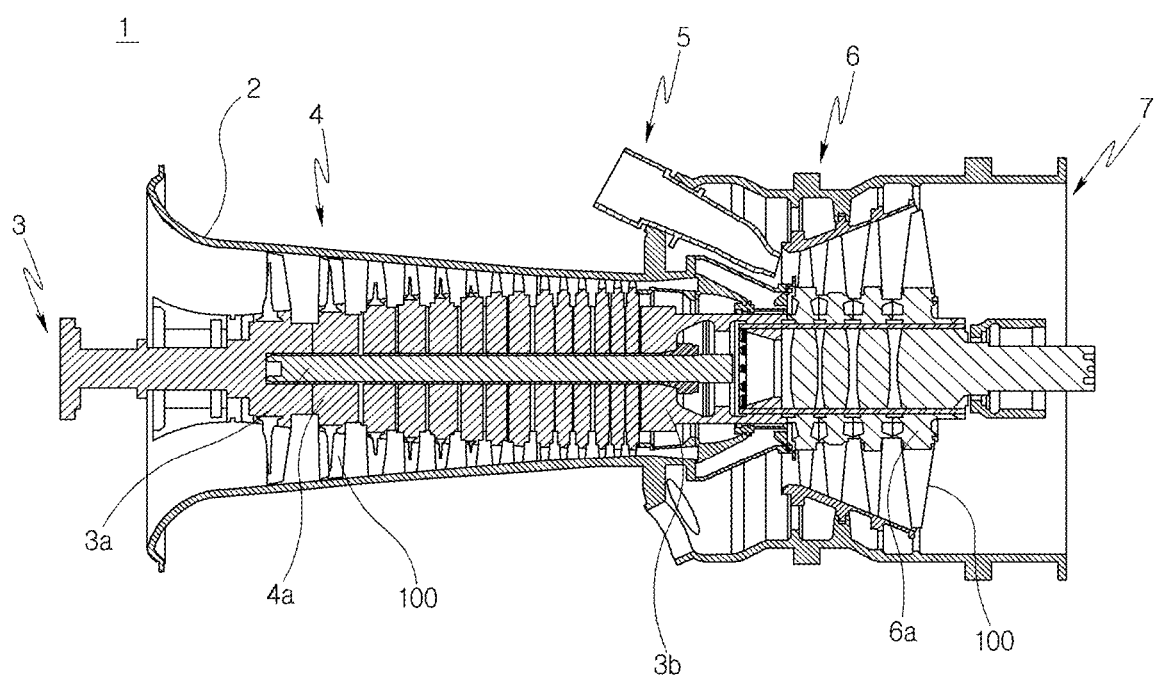

[FIG. 2B]
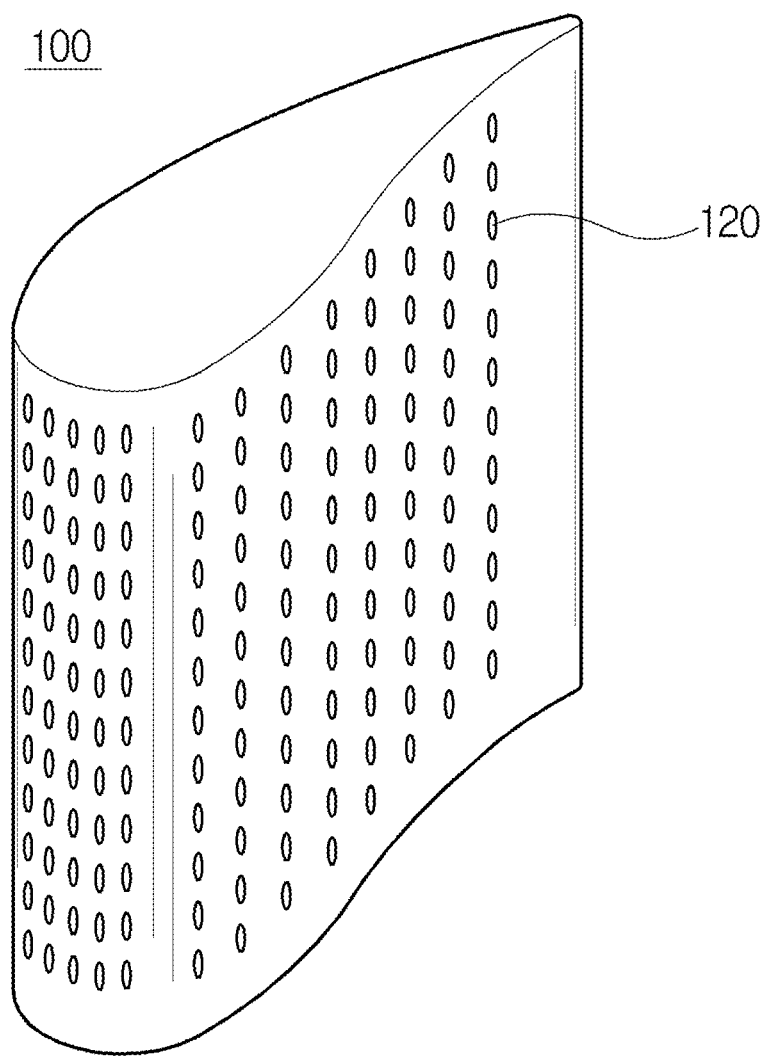

[FIG. 3A]
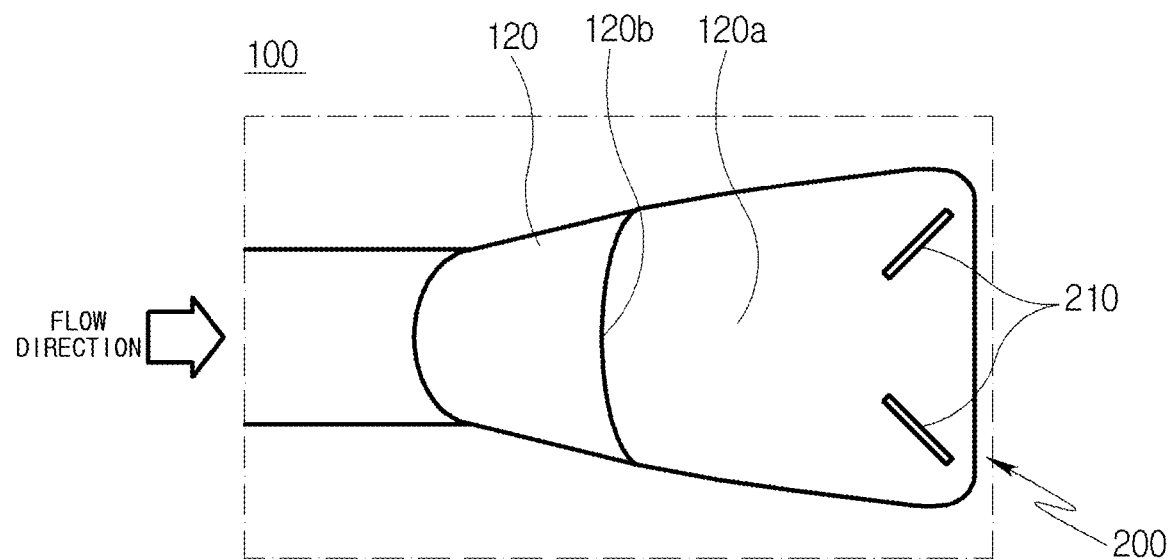

[FIG. 3B]
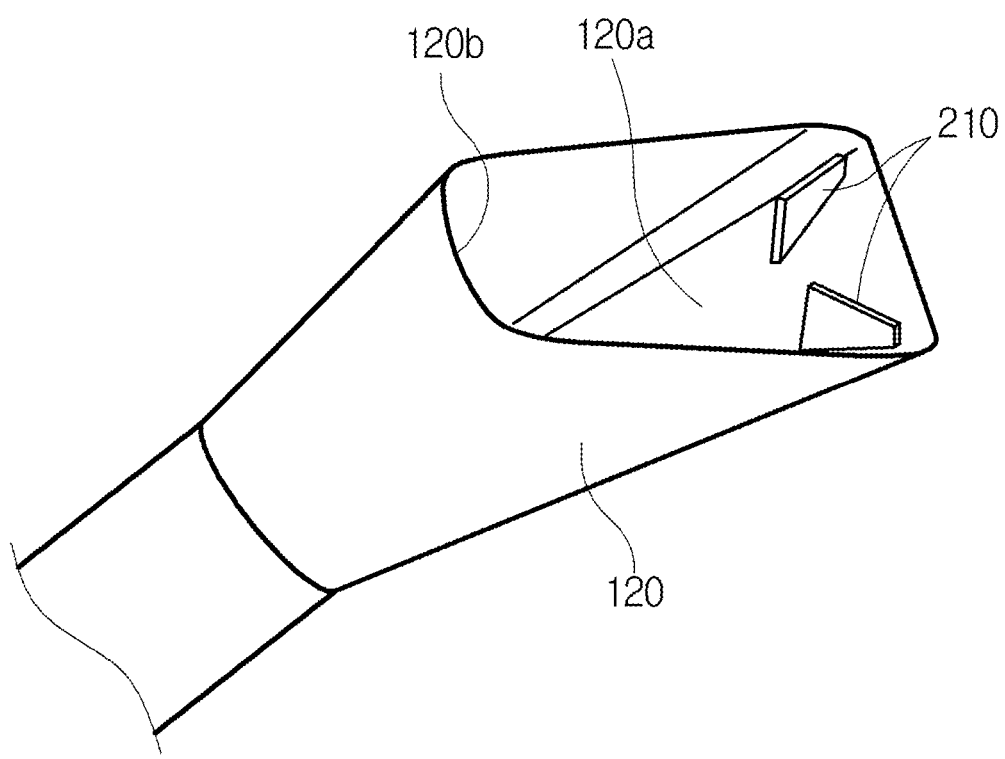

[FIG. 3C]
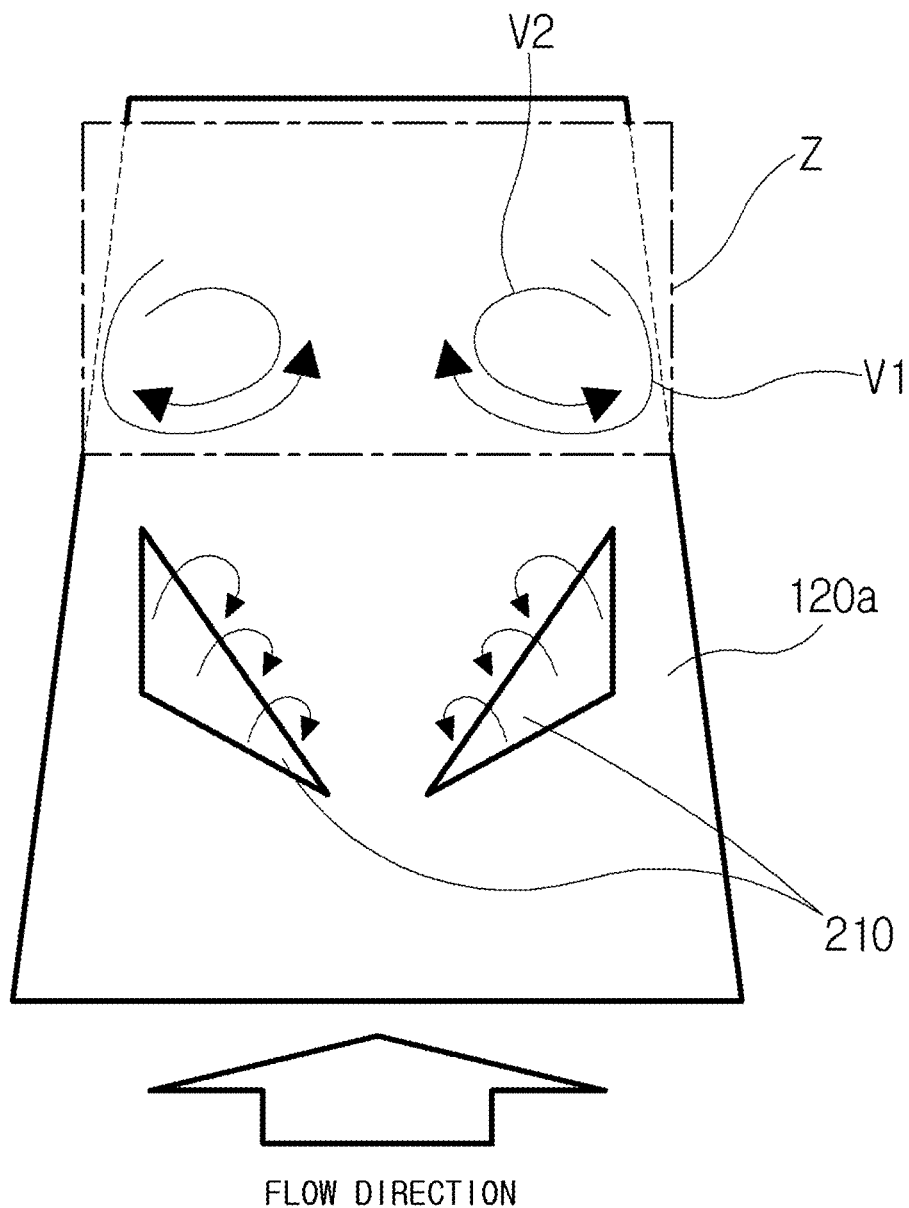

[FIG. 4A]
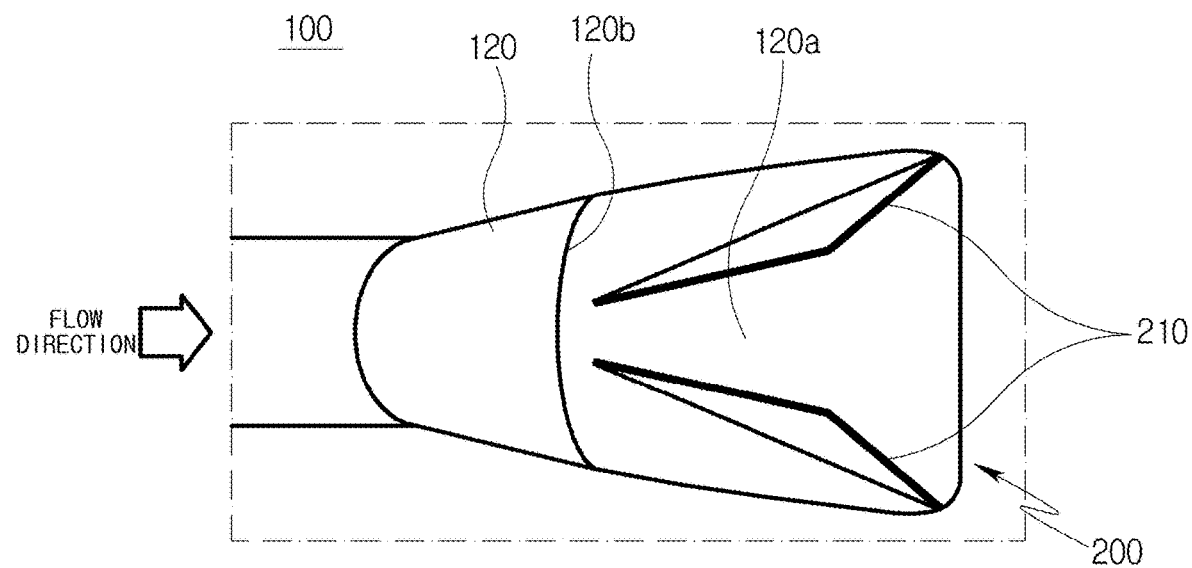

[FIG. 4B]
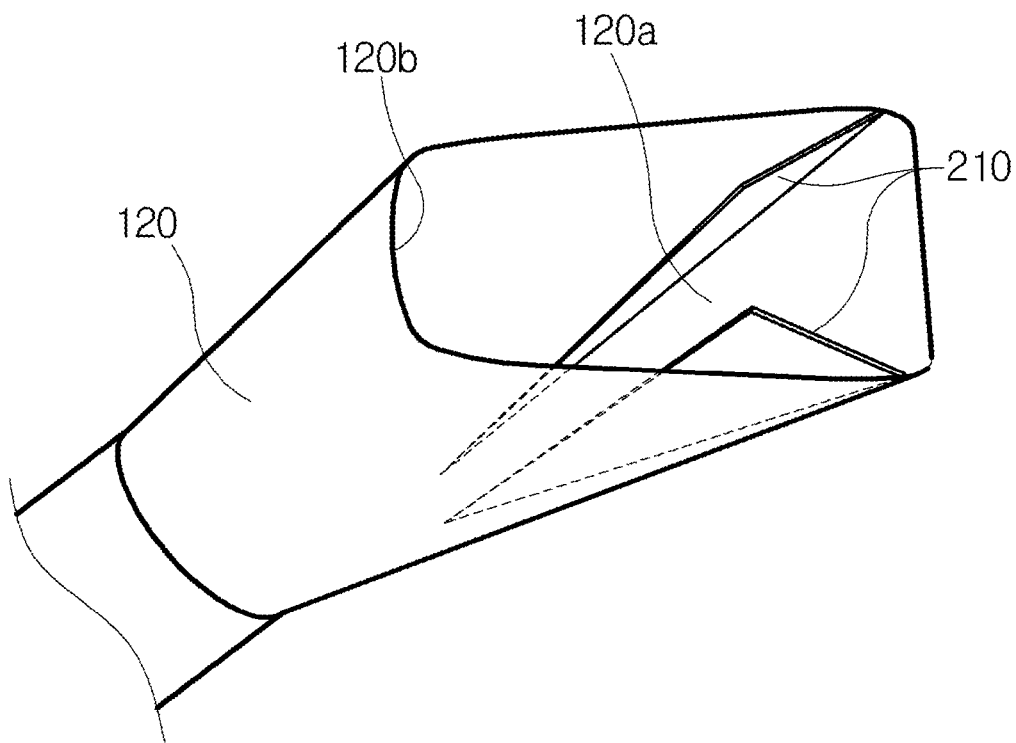

[FIG. 4C]
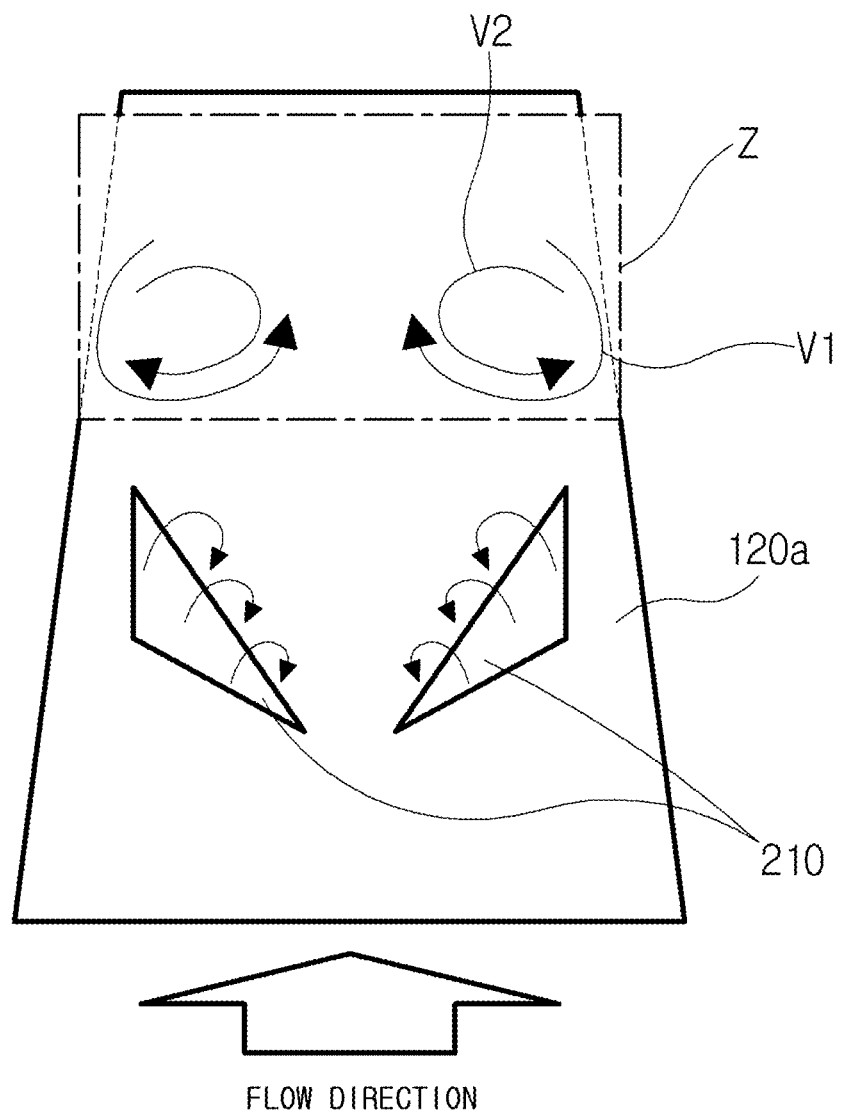

[FIG. 5A]
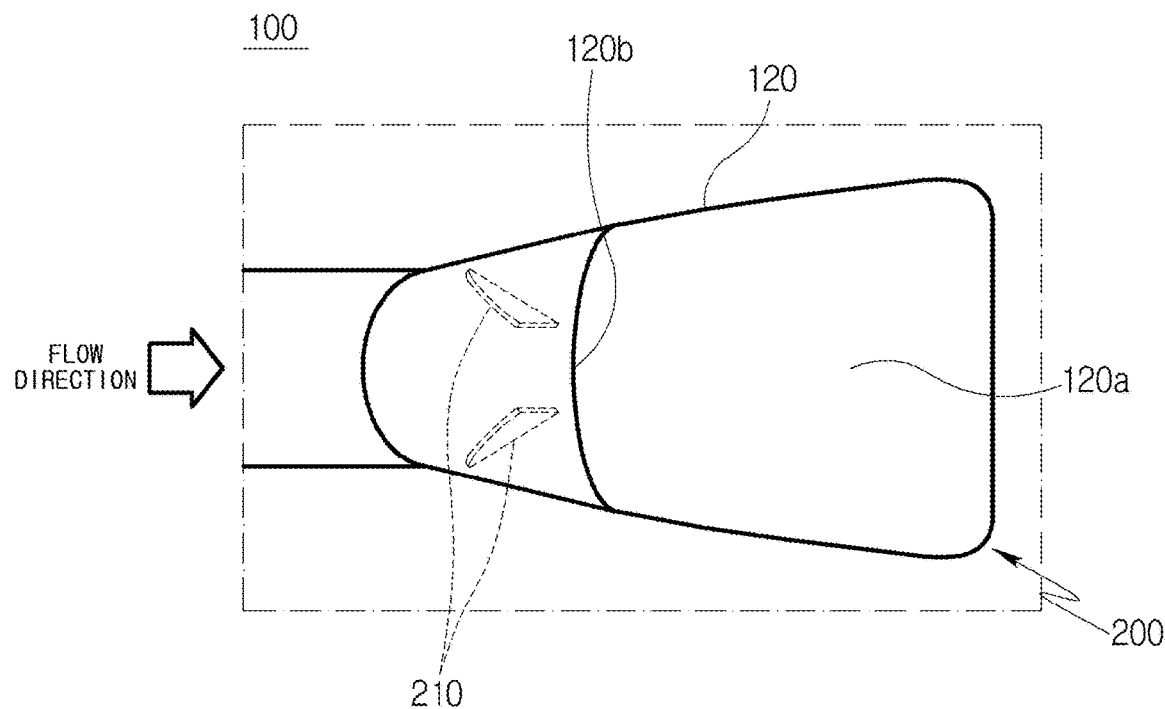

[FIG. 5B]
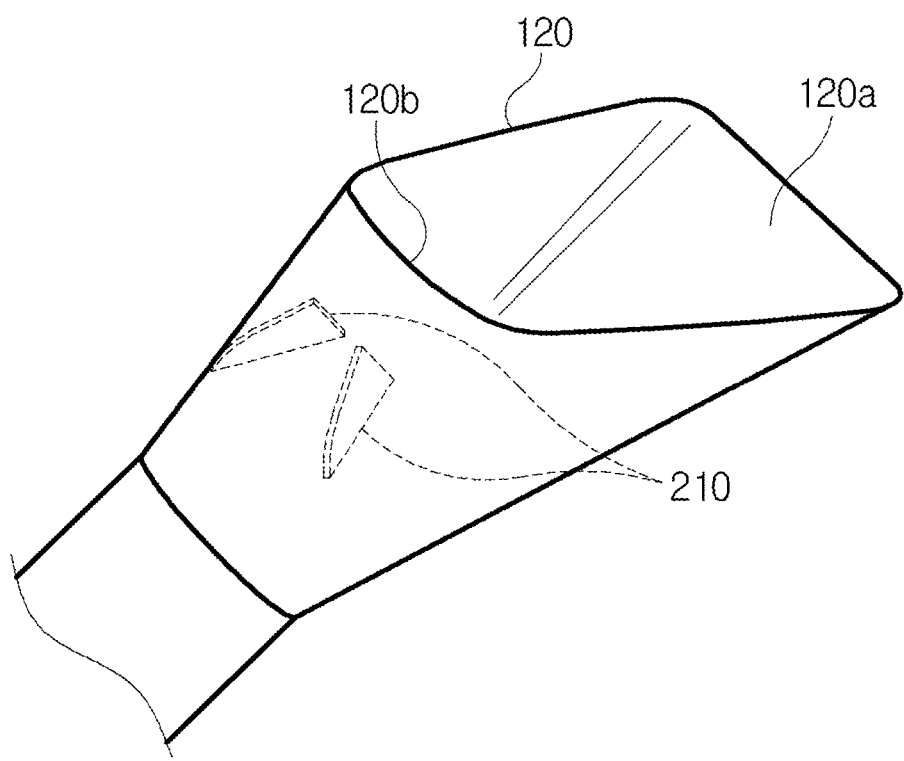

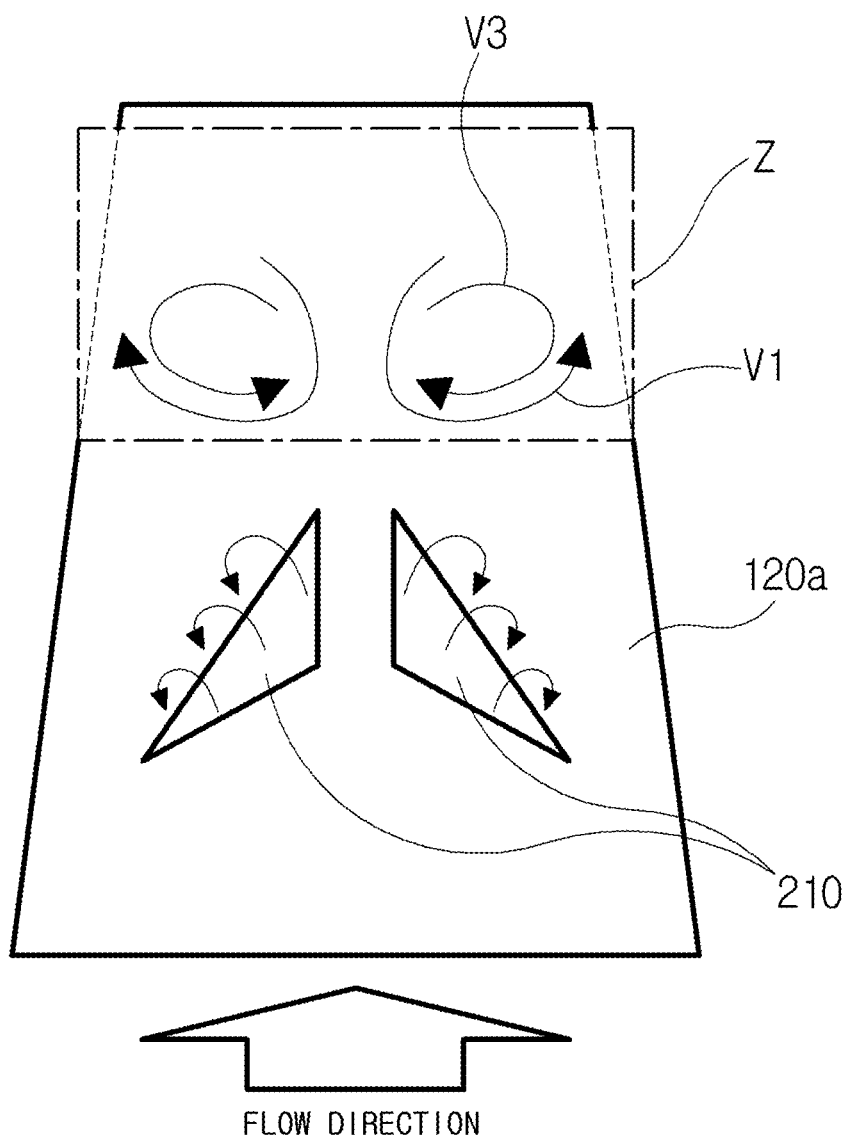
[FIG. 5C]

[FIG. 6A]
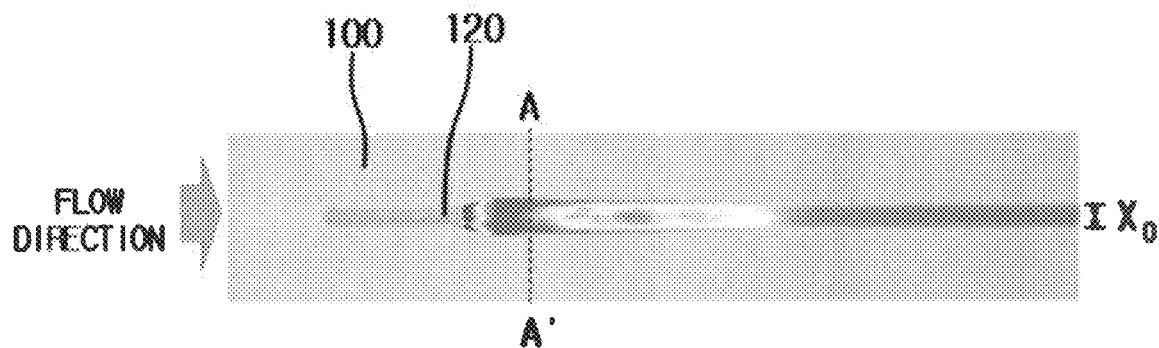
[FIG. 6B]
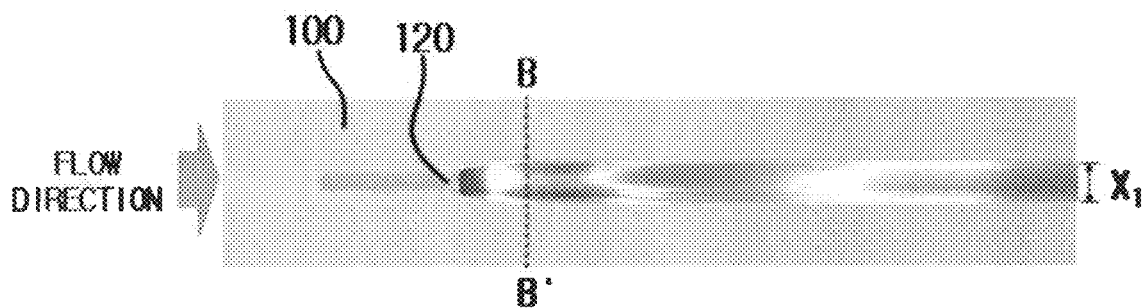
[FIG. 6C]
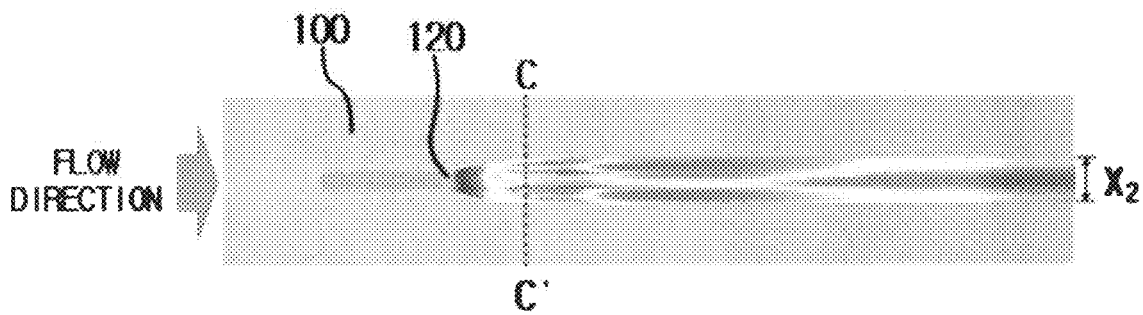
[FIG. 6D]
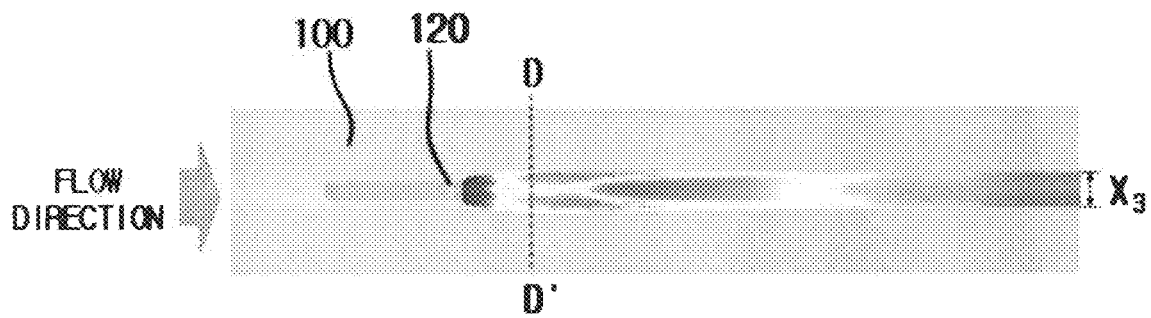

[FIG. 7A]
[A-A' CROSS-SECTIONAL VELOCITY VECTOR]
[FIG. 7B]
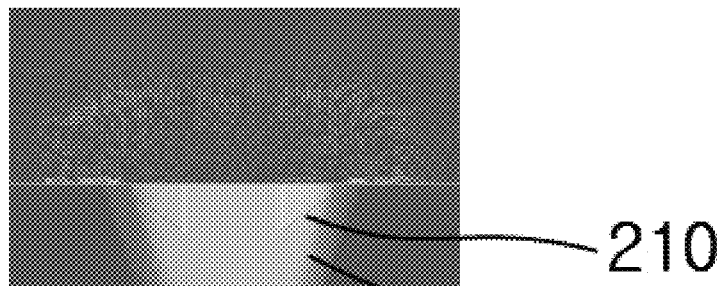
[B-B' CROSS-SECTIONAL VELOCITY VECTOR]
[FIG. 7C]
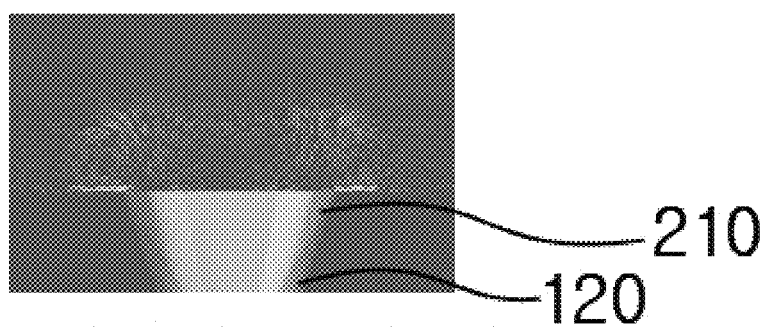
[C-C' CROSS-SECTIONAL VELOCITY VECTOR]

[FIG. 7D]
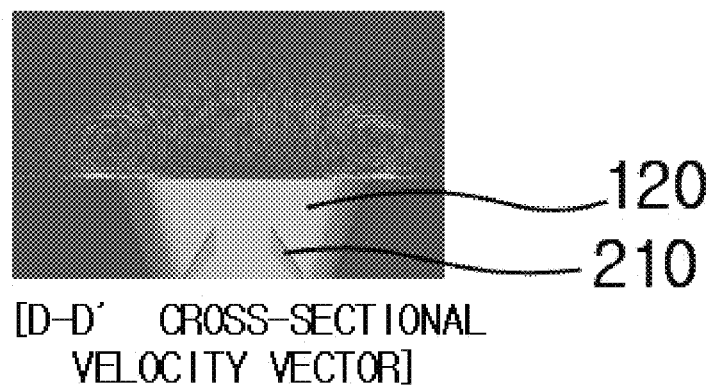
[D-D' CROSS-SECTIONAL VELOCITY VECTOR]
[FIG. 8A]
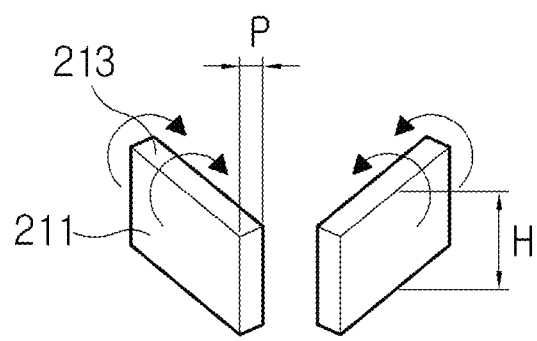
[FIG. 8B]
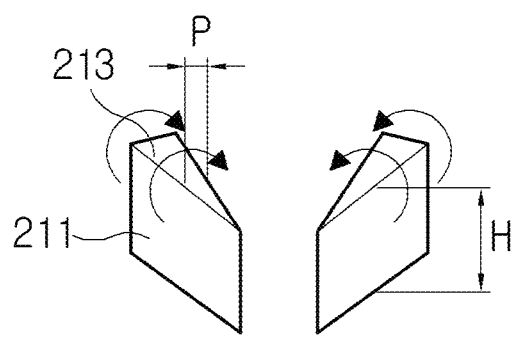

[FIG. 8C]
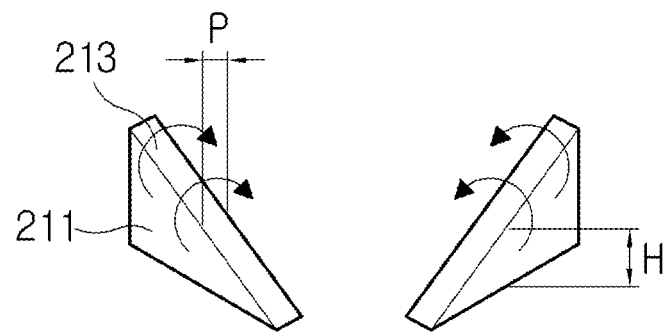
[FIG. 8D]
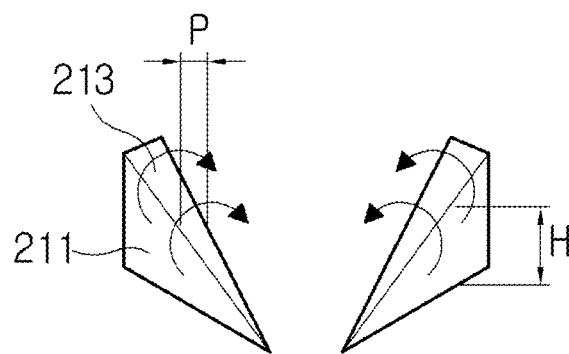
[FIG. 9A]
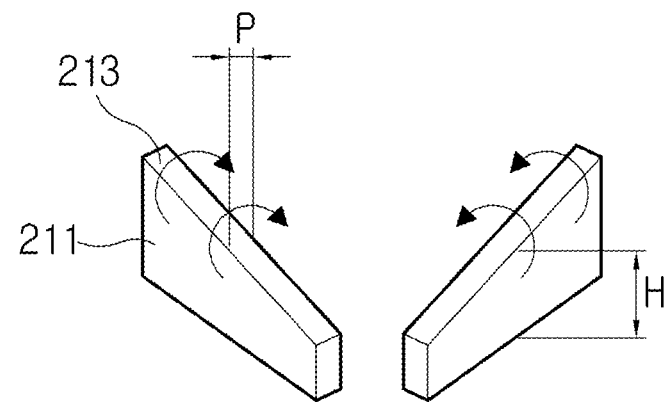

[FIG. 9B]
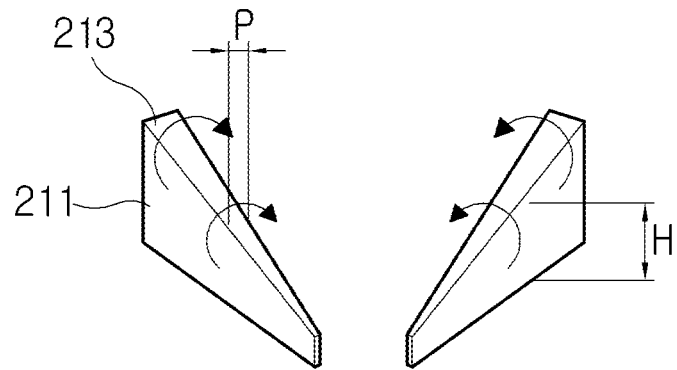
[FIG. 9C]
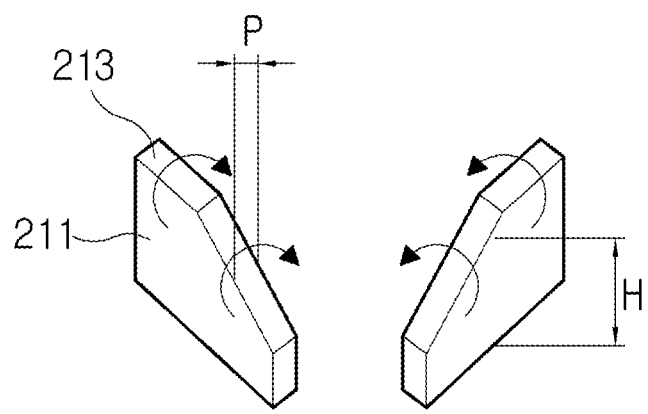
[FIG. 9D]
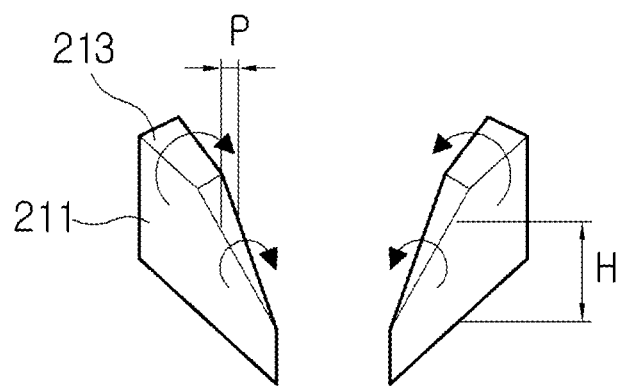

[FIG. 10A]
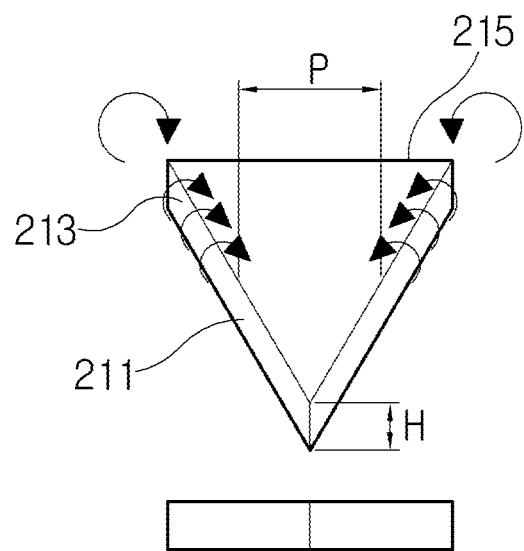
[FIG. 10B]
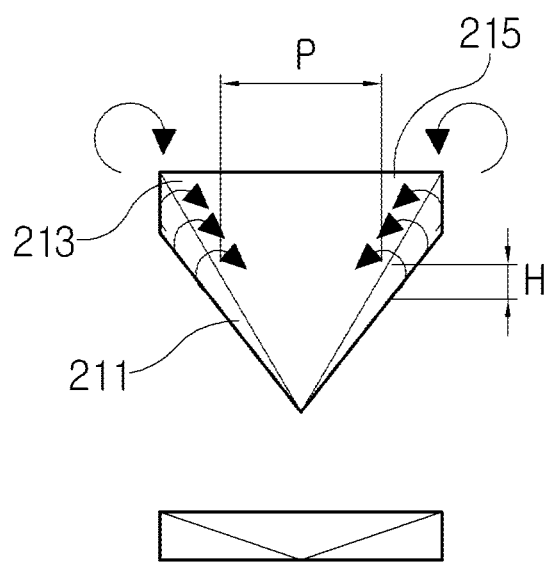

[FIG. 10C]
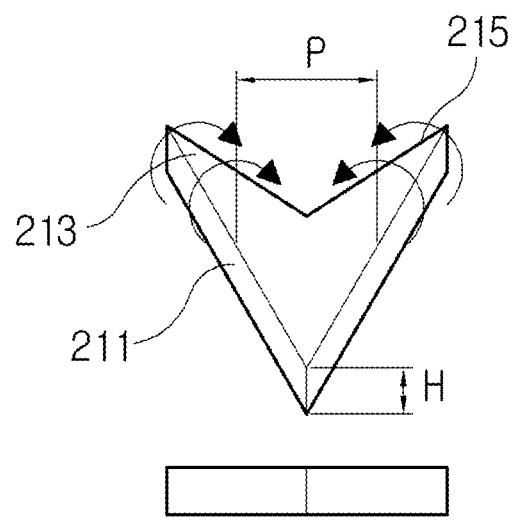
[FIG. 10D]
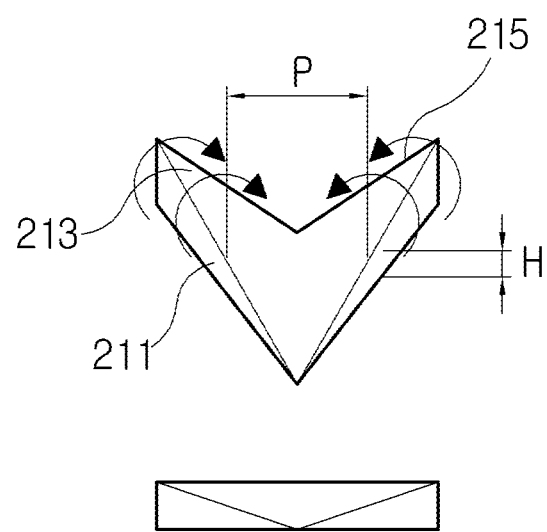

[FIG. 11A]
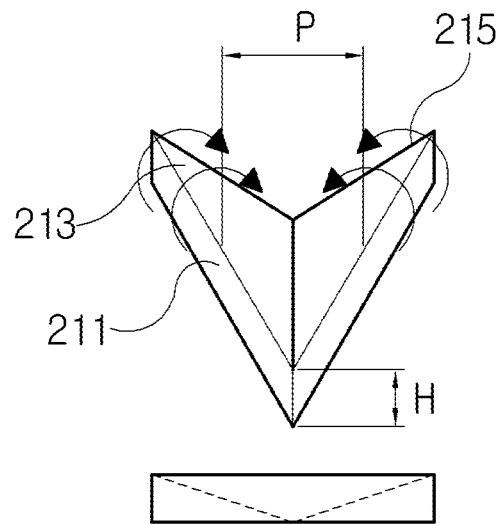
[FIG. 11B]
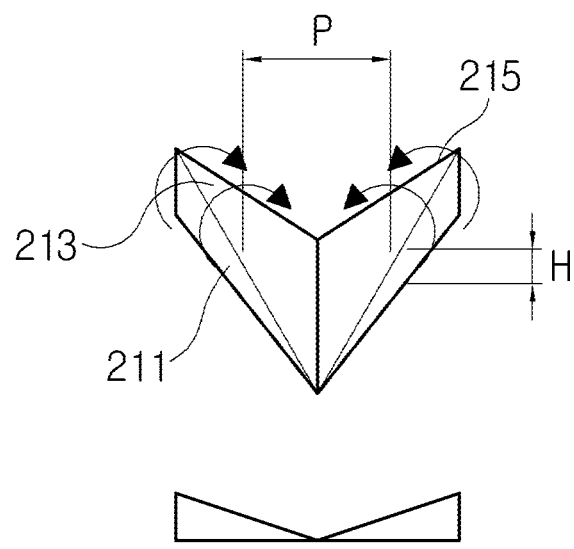

STRUCTURE FOR IMPROVING PERFORMANCE OF COOLING BLADE, AND BLADE AND GAS TURBINE HAVING THE SAME

CROSS-REFERENCE TO RELATED APPLICATION(S)

This application claims priority to Korean Patent Application No. 10-2018-0139737, filed on Nov. 14, 2018, the disclosure of which is incorporated herein by reference in its entirety.

BACKGROUND OF THE DISCLOSURE

Field of the Disclosure

Exemplary embodiments of the present disclosure relate to a structure for improving performance of cooling a blade, and a blade and a gas turbine having the structure, and more particularly, to a structure for improving performance of cooling a blade, and a blade and a gas turbine having the structure, in which a vortex relief generator is disposed on an inner periphery of a gas hole for discharging cooling fluid onto a surface of the blade to form a cooling film on the blade surface so that generation of vortexes is mitigated.

Description of the Related Art

Generally, a turbine is a power generating apparatus which converts the thermal energy of a fluid such as gas or steam into a rotating force that is mechanical energy. The turbine includes a rotor provided with a plurality of buckets arranged to axially rotate the rotor by the force of the fluid flowing through the bucket arrangement, and a casing provided with a plurality of fixed diaphragms surrounding the rotor.

A gas turbine includes a compressor section, a combustor section, and a turbine section. When the compressor rotates, external air is drawn into and compressed in the compressor. The compressed air is transmitted to the combustor, where the compressed air is mixed with fuel for combustion. High-temperature, high-pressure gas generated from the combustor passes through the turbine section and rotates the rotor of the turbine, thus driving a generator.

The compressor section and the turbine section of the gas turbine each include a plurality of stages of rotor disks coupled together as a single rotational body. A plurality of blades are mounted along an outer circumferential surface of each rotor disk. The blades are operated under high-temperature environment, particularly in the turbine section. Therefore, the surface of each blade must be continuously cooled to prevent the blade from being thermally damaged.

SUMMARY OF THE DISCLOSURE

An object of the present disclosure is to provide a structure for improving performance of cooling a blade, and a blade and a gas turbine having the structure, in which a vortex relief generator such as opposing fins is disposed on a lower or upper surface of an inner periphery of a gas hole for discharging cooling fluid onto the surface of the blade to cool the blade by forming a cooling film on the blade surface, so that generation of vortexes is mitigated, whereby the cooling fluid efficiently form a cooling film so as to cool the surface of the blade and protect the surface of the blade from thermal damage.

Other objects and advantages of the present disclosure can be understood by the following description, and become apparent with reference to the embodiments of the present disclosure. Also, it will be clear to those skilled in the art to which the present disclosure pertains that the objects and advantages of the present disclosure can be realized by the means as claimed and combinations thereof.

In accordance with one aspect of the present disclosure, there is provided a surface structure of a blade for a gas turbine in which interaction vortexes are generated between working fluid flowing along a surface of the blade and cooling fluid discharged onto the surface from an internal flow passage of the blade. The surface structure may include a gas hole having an outlet communicating with the surface of the blade to discharge the cooling fluid; and a vortex relief generator disposed so as to protrude from an inner periphery of the outlet and configured to generate counter vortexes having directionality opposite to the interaction vortexes so that the interaction vortexes are relieved by collision with the counter vortexes. The vortex relief generator may include a fin disposed in a path of the cooling fluid, and the fin may include a first surface to change a flow direction of the cooling fluid.

The fin may be disposed on a lower surface of the outlet of the gas hole or on an upper surface of the outlet of the gas hole.

The fin may include a plurality of opposing fins spaced apart from each other and disposed on the inner periphery of the outlet so as to face other. The plurality of opposing fins may include a pair of opposing fins, and each of the pair of opposing fins may have a height measured from the inner periphery that decreases in a flow direction of the cooling fluid. A distance between the opposing fins may gradually increase in a flow direction of the cooling fluid.

On the other hand, each of the pair of opposing fins may have a height measured from the inner periphery that increases in a flow direction of the cooling fluid.

The fin may include a rectangular column having a cross section of a predetermined width, which may gradually increase in a flow direction of the cooling fluid, or the fin may include a triangular column having a cross section of a predetermined height that gradually increases in a flow direction of the cooling fluid. Here, the triangular column may have a cross section of a predetermined width that gradually increases in a flow direction of the cooling fluid.

On the other hand, the fin may include a trapezoidal column having a cross section of a predetermined height that gradually increases in a flow direction of the cooling fluid, and the trapezoidal column may have a cross section of a predetermined width that gradually increases in a flow direction of the cooling fluid.

Further, the fin may include a triangular plate having a cross section of a predetermined width that gradually increases in a flow direction of the cooling fluid, and the triangular plate may have a cross section of a predetermined height that gradually increases in a flow direction of the cooling fluid. Here, the triangular plate may include a second surface that is disposed opposite the inner periphery of the outlet and has a V shape, and a third surface that is disposed on a downstream side of the fin and has a V shape.

In accordance with another aspect of the present disclosure, there is provided a blade for a gas turbine in which interaction vortexes are generated between working fluid flowing along a surface of the blade and cooling fluid discharged onto the surface from an internal flow passage of the blade. The blade may include a surface structure formed by a gas hole having an outlet communicating with the surface of the blade to discharge the cooling fluid; and a vortex relief generator disposed so as to protrude from an inner periphery of the outlet and configured to generate counter vortexes having directionality opposite to the interaction vortexes so that the interaction vortexes are relieved by collision with the counter vortexes.

In accordance with another aspect of the present disclosure, there is provided a gas turbine including a compressor to draw in and compress air; a combustor to produce combustion gas by combusting the compressed air; a turbine to generate power using the combustion gas; and a blade disposed in one of the compressor or the turbine such that interaction vortexes are generated between working fluid flowing along a surface of the blade and cooling fluid discharged onto the surface from an internal flow passage of the blade. Here, the blade includes a surface structure consistent with the above.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a diagram for illustrating interaction between working fluid and cooling fluid in the generation of vortexes;

FIG. 2A is a cross-sectional view of a gas turbine to which may be applied a blade having a structure in accordance with the present disclosure;

FIG. 2B is a perspective view of a blade having surfaces in which a plurality of gas holes are formed in accordance with the present disclosure;

FIGS. 3A-3B illustrate a first embodiment of a surface structure of a blade in accordance with the present disclosure, where FIGS. 3A and 3B are plan and perspective views, respectively, and FIG. 3C is a diagram illustrating a state of vortex relief;

FIGS. 4A-4B illustrate a second embodiment of a surface structure of a blade in accordance with the present disclosure, where FIGS. 4A and 4B are plan and perspective views, respectively, and FIG. 4C is a diagram illustrating a state of vortex relief;

FIGS. 5A-5B illustrate a third embodiment of a surface structure of a blade in accordance with the present disclosure, where FIGS. 5A and 5B are plan and perspective views, respectively, and FIG. 5C is a diagram illustrating a state of vortex relief;

FIGS. 6A-6D are diagrams showing diffusion of cooling fluid present in the structure of a blade, where FIG. 6A shows a reference and FIGS. 6B, 6C, and 6D respectively show the diffusion achieved by the first, second, and third embodiments of the present disclosure;

FIGS. 7A-7D are illustrations showing velocity vectors present in the structure of a blade along a cross section of FIGS. 6A-6D, respectively, where FIG. 7A shows a reference and FIGS. 7B, 7C, and 7D respectively show the velocity vectors achieved by the first, second, and third embodiments of the present disclosure;

FIGS. 8A-8D are perspective views of a vortex relief generator including rectangular and triangular columns in accordance with exemplary embodiments of the present disclosure;

FIGS. 9A-9D are perspective views of a vortex relief generator including trapezoidal columns in accordance with exemplary embodiments of the present disclosure;

FIGS. 10A-10D are perspective views of a vortex relief generator including triangular plates in accordance with exemplary embodiments of the present disclosure; and FIGS. 11A and 11B are perspective views of a vortex relief generator including V-shaped surfaces in accordance with exemplary embodiments of the present disclosure.

DESCRIPTION OF THE EMBODIMENTS

A structure for improving cooling performance of a blade in accordance with the present disclosure, and a blade and gas turbine having the structure, will be described in detail with reference to the accompanying drawings.

Improved cooling performance in accordance with the present disclosure, to include continuously cooling the surface of each blade of a gas turbine by film cooling, can prevent the blade from being thermally damaged. FIG. 1 illustrates challenges in this respect, whereby a low-temperature gas, i.e., the fluid cooling the blade, merges with a high-temperature gas, i.e., the working fluid of the gas turbine, to generate vortexes.

Referring to FIG. 1, a plurality of gas holes 20 coupled with an internal flow passage (not shown) along which cooling fluid flows are formed in a blade 10. Cooling fluid is discharged from the gas holes 20 and flows along the surface of the blade 10 and forms a cooling film, thus cooling the blade 10. The discharged cooling fluid generates vortexes V1 in the region of a plane Z (region Z) when the cooling fluid merges with the working fluid flowing in the same general direction as that of the cooling fluid. The vortexes impede the flow of cooling fluid, interfering with the generation of the cooling film and thereby diminishing the cooling effect of film cooling.

Hereinafter, the configuration of an exemplary gas turbine will be generally described.

Referring to FIG. 2A, a gas turbine 1 may basically include a casing 2 which forms an appearance of the gas turbine 1, a compressor section 4 configured to compress air, a combustor section 5 configured to combust the compressed air, a turbine section 6 configured to generate electricity using combustion gas, a diffuser 7 configured to discharge exhaust gas, and a rotational body 3 which includes the compressor section 4 with the turbine section 6 to transmit rotating force.

External air is drawn into the compressor section 4 that thermodynamically corresponds to an upstream side of the gas turbine 1. The drawn external air is compressed by adiabatic compression. The compressed air is drawn into the combustor section 5 and mixed with fuel, and the mixture is combusted through a constant pressure combustion process. Combustion gas is drawn into the turbine section 6 corresponding to a downstream side of the gas turbine 1 and is expanded through an adiabatic expansion process. A torque tube 3b for transmitting rotational torque generated from the turbine section 6 to the compressor section 4 is provided between the upstream-side compressor section 4 and the downstream-side turbine section 6.

The compressor section 4 is provided with a plurality (e.g., fourteen) of compressor rotor disks 4a. The compressor rotor disks 4a are coupled by a tie rod 3a such that they are not spaced apart from each other in an axial direction. The compressor rotor disks 4a are arranged along the axial direction of the tie rod 3a. A flange protruding in the axial direction is formed around an outer circumferential portion of each compressor rotor disk 4a and is coupled to a neighboring rotor disk 4a so as to prevent the adjacent rotor disks 4a from rotating relative to each other. A plurality of blades (or "buckets") 100 are radially coupled to an outer circumferential surface of each compressor rotor disk 4a. Each of the blades 100 includes a dovetail (not shown) by which the blade 100 is coupled to the compressor rotor disk 4a. Relative to a rotation of the compressor blades 100, a plurality of vanes or "nozzles" (not shown) may be mounted to a diaphragm (not shown) and disposed on an inner circumferential surface of the casing 2 in the compressor section 4.

The tie rod 3a passes through respective central portions of the compressor rotor disks 4a and has a first end coupled to the farthest upstream compressor rotor disk 4a and a second end fixed to the torque tube 3b. The tie rod 3a may be variously configured depending on the structure of the gas turbine, including a single tie rod as shown in FIG. 2A, a plurality of tie rods arranged in a circumferential direction, or a combination of these.

The combustor section 5 mixes introduced compressed air with fuel, combusts the fuel mixture to generate high-temperature, high-pressure combustion gas having high energy. Through an isobaric combustion process, the temperature of the combustion gas is increased to a heat resistant limit temperature at which components of the combustor section 5 and the turbine section 6 can endure. The combustor section 5 includes a plurality of combustors arranged as cells around the casing 2.

The combustion gas exiting the combustor section 5 expands in the turbine section 6 to apply driving force and reaction force to an impeller of the turbine section 6, thus generating mechanical energy. Some of the mechanical energy obtained from the turbine section 6 is supplied as energy needed to compress air in the compressor section 4, and the remaining mechanical energy is used to drive a generator and produce electric power. The turbine section 6 is formed of a plurality of stators and a plurality of rotors which are alternately arranged in a turbine casing. The rotors are driven by the combustion gas so as to rotate an output shaft coupled to the generator.

The turbine section 6 includes a plurality of turbine rotor disks 6a, each configured basically the same as the compressor rotor disks 4a. For example, the turbine rotor disk 6a also includes a flange (not shown) provided for coupling with a neighboring turbine rotor disk 6a, and a plurality of turbine blades (or "buckets") 100 which are radially provided and coupled to the turbine rotor disk 6a in a dovetail coupling manner. Relative to a rotation of the turbine blades 100, a plurality of vanes or "nozzles" (not shown) may be mounted to a diaphragm (not shown) and disposed on an inner circumferential surface of the casing 2 in the turbine section 6.

In the gas turbine having the above configuration, introduced air is compressed in the compressor section 4, combusted in the combustor section 5, transferred to the turbine section 6 to generate electricity, and then discharged to the atmosphere through the diffuser 7. Here, rotational components of the gas turbine include the torque tube 3b, the compressor rotor disks 4a, the compressor blades 100, the turbine rotor disks 6a, the turbine blades 100, and the tie rod 3a, which together with similarly provided components may be collectively referred to as the rotational body 3, or the rotor of the gas turbine. Meanwhile, non-rotational components include the casing 2, the vanes (not shown), the diaphragm (not shown), which together with similarly provided components may be collectively referred to as a stationary body, or the stator of the gas turbine.

A blade of the present disclosure may be applied to the above-described gas turbine.

Hereinafter, the structure of a blade in accordance with exemplary embodiments of the present disclosure will be described. The blade of the present disclosure may constitute one of the plurality of turbine blades (100) or one of the plurality of compressor blades (100).

Referring to FIG. 2B, a plurality of gas holes 120 to which the structure of the present disclosure is applied are formed in the surface of the blade 100 that is operated in a high-temperature environment. Cooling fluid ejected from the plurality of gas holes 120 flows along the surface of the blade 100 and thus forms a cooling film on the surface of the blade 100 so as to cool the blade 100 and to protect the blade 100 from thermal damage.

FIGS. 3A-3C relate to a structure according to a first embodiment of the present disclosure.

Referring to FIGS. 3A and 3B, a structure for improving the cooling performance of a blade 100 may include a gas hole 120 formed in the surface of a blade 100 and a vortex relief generator 200. The gas hole 120 includes an inlet coupled to an internal flow passage of the blade 100 and an outlet communicating with the surface of the blade 100 so that cooling fluid may be discharged onto the surface of the blade 100 to cool the surface of the blade 100. The outlet of the gas hole 120 has an inner surface that includes lower and upper surfaces 120a and 120b and may have a cross section that gradually increases toward the surface so as to allow cooling fluid to be widely discharged onto the surface of the blade 100. The gas hole 120 typically includes a plurality of gas holes distributed across the surface of the blade 100 as shown in FIG. 2B.

The vortex relief generator 200 may be disposed on an inner periphery of the gas hole 120, within the outlet, and may be configured to generate counter vortexes. Here, the counter vortexes are formed in a direction opposite to that of the vortexes (or "interaction vortexes") generated as shown in FIG. 1 by an interaction between working fluid flowing along the surface of the blade 100 and cooling fluid discharged from the gas hole 120. Generation of the counter vortexes produces a collision between the counter vortexes and the interaction vortexes and thus relieves the interaction vortexes. In other words, the generation of the counter vortexes provides vortex relief.

In the present disclosure, the vortex relief generator 200 may have the form of one or more fins 210 disposed on the inner periphery of the gas hole 120. Here, the fins 210 may be provided to change the flow direction of cooling fluid and thus form counter vortexes. The fins 210 may include a plurality of opposing fins, and the plurality may include at least one pair of opposing fins.

In the first embodiment of the present disclosure, a pair of opposing fins 210 may be disposed on the lower surface 120a. Thus, each of the opposing fins 210 protrudes from the lower surface 120a and has an inclined edge disposed away from its base at the lower surface 120a. According to the first embodiment of the present disclosure, the inclined edge may have a height that decreases in the flow direction of fluid, and the opposing fins 210 may be disposed such that the distance between the opposing fins 210 gradually increases in the flow direction of fluid.

Referring to FIG. 3C, when cooling fluid is discharged from the outlet of the gas hole 120, the cooling fluid flows over the opposing fins 210 disposed on the lower surface 120a. Thus, the flow of cooling fluid is impeded by the opposing fins 210. As a result, counter vortexes V2 are generated in region Z. The counter vortexes V2 are formed in the direction opposite to that of the interaction vortexes V1. Therefore, the vortexes V1 and V2 collide with each other and thus are relieved. Due to the vortex relief effect, the flow of cooling fluid on the surface of the blade 100 is stabilized, and a cooling film is reliably formed on the surface of the blade 100. Consequently, the effect of cooling the blade 100 may be enhanced.

FIGS. 4A-4C relate to a structure according to a second embodiment of the present disclosure.

Referring to FIGS. 4A and 4B, there is provided the configuration of a second embodiment in which the length, the width, or the size of the opposing fins 210 illustrated in FIGS. 3A and 3B is increased in the flow direction of the cooling fluid.

The second embodiment of the present disclosure shows that the size or the range of counter vortexes V2 generated in region Z may be controlled by adjusting the length, the width, or the size of the opposing fins 210. For example, compared to the first embodiment, if the length, the width, and the size of the opposing fins are extended, the size or the range of the counter vortexes V2 may be increased in the second embodiment.

The vortex relief effect according to the second embodiment of the present disclosure is illustrated in FIG. 4C and is similar to that of the first embodiment as shown in FIG. 3C.

FIGS. 5A-5C relate to a structure according to a third embodiment of the present disclosure.

Referring to FIGS. 5A and 5B, in the third embodiment of the present disclosure, the opposing fins 210 are disposed on the upper surface 120$b$ of the outlet and are arranged such that the distance between the opposing fins 210 gradually decreases in the flow direction of fluid.

Referring to FIG. 5C, when cooling fluid is discharged from the outlet of the gas hole 120, the cooling fluid flows over the opposing fins 210 disposed on the upper surface 120$b$. Thus, the flow of cooling fluid is impeded by the opposing fins 210. As a result, counter vortexes V3 are generated in region Z. The counter vortexes V3 are formed in the direction opposite to that of the interaction vortexes V1. Therefore, the vortexes V1 and V3 collide with each other and thus are relieved. Due to the vortex relief effect, the flow of cooling fluid on the surface of the blade 100 is stabilized, and a cooling film is reliably formed on the surface of the blade 100. Consequently, the effect of cooling the blade 100 may be enhanced.

Here, it should be appreciated that FIG. 3C illustrates the direction of the original vortexes V1 based on the lower surface 120$a$ inside the gas hole 120, while FIG. 5C illustrates the direction of the interaction vortexes V1 based on the upper surface 120$b$ inside the gas hole 120. Therefore, the arrows designating the interaction vortexes V1 of FIGS. 3C and 5C indicate the same direction. In other words, although the directions of the counter vortexes V2 (FIG. 3C) and V3 (FIG. 5C) seem to be opposite to each other, the vortexes V2 and V3 are substantially formed in the same direction because they are respectively based on the lower surface 120$a$ and the upper surface 120$b$ inside the gas hole 120.

FIGS. 6A-6D and FIGS. 7A-7D compare parameters of the first through third embodiments to the same parameters of a reference structure, wherein FIG. 6A shows a reference distribution of cooling fluid on a blade surface and FIG. 7A shows reference velocity vectors along a cross-sectional line A-A' of FIG. 6A. In comparison, FIGS. 6B and 7B illustrate the distribution of cooling fluid on the surface of the blade 100 and the velocity vectors along a cross-sectional line B-B' in accordance with the first embodiment of the present disclosure; FIGS. 6C and 7C illustrate the distribution of cooling fluid on the surface of the blade 100 and the velocity vectors along a cross-sectional line C-C' in accordance with the second embodiment of the present disclosure; and FIGS. 6D and 7D illustrate the distribution of cooling fluid on the surface of the blade 100 and the velocity vectors along a cross-sectional line D-D' in accordance with the third embodiment of the present disclosure.

By the comparison of FIGS. 6A-6D, the flow of cooling fluid discharged from the gas hole 120 according to the present disclosure is shown have increased width ($X_1$, $X_2$, $X_3$) over that ($X_0$) of a structure without the opposing fins 210. The increased width enables a greater range in which a cooling film can be formed. This increase in the width of flow results from relief of vortexes at the outlet of the gas hole 120.

Here, a red region indicates that the flow speed of cooling fluid is relatively high. It is indicated that the flow speed of cooling fluid is reduced in a sequence of yellow, green, and blue regions. In other words, in FIG. 6A, vortexes are strongly generated at the outlet of the gas hole. Thereby, cooling fluid is focused centrally rather than being diffused. Also, as illustrated by the red region, the flow speed of cooling fluid is comparatively high, so that the widthwise diffusion effect is reduced as it proceeds downstream from the gas hole 120. Hence, the relatively narrow flow width $X_0$ means that a region in which a cooling film can be formed on the surface of the blade 100 is relatively small.

The greater areas of the yellow and green regions of FIGS. 6B-6D means that the overall flow speed is reduced because vortexes on the outlet of the gas hole 120 are reduced and thus cooling fluid is evenly diffused from the outlet of the gas hole 120. Since the flow speed is reduced, cooling fluid may be effectively diffused. Therefore, the flow widths $X_1$, $X_2$, and $X_3$ increase downstream of the gas hole 120, in contrast to the effect of the flow width $X_0$, such that a region in which a cooling film can be formed on the surface of the blade 100 is relatively large.

Hence, the number of gas holes needed in the blade according to the present disclosure may be less than the number needed in a contemporary blade. Consequently, with fewer gas holes formed in the surface of the blade, the stiffness of the blade may be enhanced, and the production cost may be reduced.

Referring to FIG. 7A and FIGS. 7B to 7D, with regard to colors indicating the velocity vectors of cooling fluid, red indicates that the speed is highest, and the colors means that the speed is reduced in a sequence of red, yellow, green, and blue.

FIG. 7A, showing the case without the opposing fins 210, the rate of generation of interaction vortexes is relatively high. Referring to the velocity vectors of FIG. 7A, the central area of the outlet of the gas hole 120 is blue, and, in opposite sides of the outlet of the gas hole 120, vortexes are distributed in a shape in which the vortexes densely and strongly swirl, as illustrated by the velocity vectors. This indicates that uniform diffusion of cooling fluid on the outlet of the gas hole 120 is impeded by vortexes. In other words, on the opposite sides of the outlet of the gas hole 120, the flow of cooling fluid is not smooth due to generation of strong vortexes. Toward the center of the outlet of the gas hole 120, the speed of the flow of cooling fluid is low, as indicated by blue. Thus, cooling fluid ejected from the gas hole 120 may not be uniformly diffused.

Due to such an uneven flow, as illustrated in FIG. 6A, cooling fluid may not be evenly diffused on the surface of the blade 100, and the flow width $X_0$ is relatively small. Hence, the performance of cooling the blade is reduced.

On the other hand, FIGS. 7B to 7D illustrate that generation of vortexes is relieved compared to that of FIG. 7A, so that the velocity vectors in the blue region, the green region, and the yellow region in the peripheral portion of the outlet of the gas hole 120 may be relatively uniformly distributed.

Referring to FIGS. 7B to 7D, the velocity vectors of the blue region, the green region, and the yellow region on the outlet of the gas hole 120 are comparatively widely and uniformly distributed. Furthermore, unlike of the case of FIG. 7A, the vortexes form velocity vectors in a shape in which vortexes circulate in a large area.

This means that cooling fluid ejected from the gas hole 120 form counter vortexes opposite to the interaction vortexes during a process of passing through the opposing fins 210 and thus the counter vortexes collides with the interaction vortexes to relieve overall vortexes, whereby disturbance of the flow of cooling fluid is relatively mitigated.

As described above with reference to FIGS. 6B to 6D, when cooling fluid is ejected from the outlet of the gas hole 120, the flow of cooling fluid is uniformly realized. Consequently, the width of the flow of cooling fluid may be increased, the performance of cooling the blade 100 may be enhanced.

FIGS. 8 to 11 are diagrams illustrating various embodiments of the opposing fins 210.

Referring to FIG. 8A, each of the opposing fins 210 in accordance with an embodiment of the present disclosure may have a rectangular column shape. In this case, the height H and the width P of each rectangular column remain constant.

The flow of cooling fluid discharged form the outlet of the gas hole 120 is disturbed by a first surface 211 of each of the opposing fins 210 having a rectangular column shape described above and is changed toward the second surface 213 so that the cooling fluid flows over the opposing fin 210. Here, a pair of opposing fins 210 are disposed on the outlet of the gas hole 120 in such a way that the opposing fins 210 are inclined to each other. Hence, cooling fluid that flows over the opposing fins 210 form counter vortexes.

Referring FIG. 8B, each of the opposing fins 210 in accordance with an embodiment of the present disclosure may have a rectangular column shape that gradually increases in widthwise (P) cross-sectional area based on the flow direction of fluid. In this case, the height H of the rectangular column remains constant, but the width P thereof is increased with respect to the flow direction of fluid. Particularly, on the central side front parts of the pair of opposing fins 210 having a relatively small widthwise (P) cross-sectional area, cooling fluid may flow over the second surfaces 213 of the opposing fins 210 with a relatively short distance.

The flow of cooling fluid discharged form the outlet of the gas hole 120 is disturbed by the first surface 211 of each of the opposing fins 210 having a rectangular column shape having a variable width P and is changed toward the second surface 213 so that the cooling fluid flows over the opposing fin 210. Here, the pair of opposing fins 210 are disposed on the outlet of the gas hole 120 in such a way that the opposing fins 210 are inclined to each other. Hence, cooling fluid that flows over the opposing fins 210 form counter vortexes.

Referring FIG. 8C, each of the opposing fins 210 in accordance with an embodiment of the present disclosure may have a triangular column shape that gradually increases in heightwise (H) cross-sectional area based on the flow direction of fluid. In this case, the height H of each triangular column increases in the flow direction of fluid, and the width P thereof remains constant.

The flow of cooling fluid discharged form the outlet of the gas hole 120 is disturbed by a first surface 211 of each of the opposing fins 210 having a triangular column shape described above and is changed toward the second surface 213 so that the cooling fluid flows over the opposing fin 210.

The pair of opposing fins 210 are disposed on the outlet of the gas hole 120 in such a way that the opposing fins 210 are inclined to each other. Hence, cooling fluid that flows over the opposing fins 210 form counter vortexes.

Here, counter vortexes formed by cooling fluid passing through outer edge sides of the pair of opposing fins 210 having a relatively high height H are larger than counter vortexes formed by cooling fluid passing through the central side of the pair of opposing fins 210 that has a relatively low height H.

The size or the range of counter vortexes may be adjusted by adjusting the height H of the opposing fins 210 each having a triangular column shape. For example, if the increase rate of the height H is increased, the counter vortexes may be more strongly formed. In contrast, if the increase rate of the height H is reduced, the counter vortexes may be more lightly formed.

Referring FIG. 8D, each of the opposing fins 210 in accordance with an embodiment of the present disclosure may have a triangular column shape having heightwise (H) and widthwise (P) cross-sectional areas that increase based on the flow direction of fluid. In this case, the height H and the width P of the triangular column are increased with respect to the flow direction of fluid.

The flow of cooling fluid discharged form the outlet of the gas hole 120 is disturbed by a first surface 211 of each of the opposing fins 210 having a triangular column shape described above and is changed toward the second surface 213 so that the cooling fluid flows over the opposing fin 210.

The pair of opposing fins 210 are disposed on the outlet of the gas hole 120 in such a way that the opposing fins 210 are inclined to each other. Hence, cooling fluid that flows over the opposing fins 210 form counter vortexes.

Here, counter vortexes formed by cooling fluid passing through outer edge sides of the pair of opposing fins 210 having relatively large height H and width P are larger than counter vortexes formed by cooling fluid passing through the central side of the pair of opposing fins 210 that has relatively small height H and width P.

The size or the range of counter vortexes may be adjusted by adjusting the height H and the width P of the opposing fins 210 each having a triangular column shape. For example, if the increase rate of the height H is increased or the increase rate of the width P is increased, the counter vortexes are more strongly generated. In contrast, if the increase rate of the height H is reduced or the increase rate of the width P is reduced, the counter vortexes are more lightly generated.

Referring to FIGS. 9A and 9C, each of the opposing fins 210 in accordance with an embodiment of the present disclosure may have a trapezoidal column shape that gradually increases in heightwise cross-sectional area based on the flow direction of fluid. In this case, the height H of each trapezoidal column increases in the flow direction of fluid, and the width P thereof remains constant.

The flow of cooling fluid discharged form the outlet of the gas hole 120 is disturbed by a first surface 211 of each of the opposing fins 210 having a trapezoidal column shape described above and is changed toward the second surface 213 so that the cooling fluid flows over the opposing fin 210.

The pair of opposing fins 210 are disposed on the outlet of the gas hole 120 in such a way that the opposing fins 210 are inclined to each other. Hence, cooling fluid that flows over the opposing fins 210 form counter vortexes.

Here, counter vortexes formed by cooling fluid passing through outer edge sides of the pair of opposing fins 210 having a relatively high height H are larger than counter vortexes formed by cooling fluid passing through the central side of the pair of opposing fins 210 that has a relatively low height H.

The size or the range of counter vortexes may be adjusted by adjusting the height H of the opposing fins 210 each having a trapezoidal column shape. For example, if the increase rate of the height H is increased, the counter vortexes may be more strongly formed. In contrast, if the increase rate of the height H is reduced, the counter vortexes may be more lightly formed.

Referring FIGS. 9B and 9D, each of the opposing fins 210 in accordance with an embodiment of the present disclosure may have a trapezoidal column shape having heightwise (H) and widthwise (P) cross-sectional areas that increase based on the flow direction of fluid. In this case, the height H and the width P of the trapezoidal column are increased with respect to the flow direction of fluid.

The flow of cooling fluid discharged form the outlet of the gas hole 120 is disturbed by a first surface 211 of each of the opposing fins 210 having a trapezoidal column shape described above and is changed toward the second surface 213 so that the cooling fluid flows over the opposing fin 210.

The pair of opposing fins 210 are disposed on the outlet of the gas hole 120 in such a way that the opposing fins 210 are inclined to each other. Hence, cooling fluid that flows over the opposing fins 210 form counter vortexes.

Here, counter vortexes formed by cooling fluid passing through outer edge sides of the pair of opposing fins 210 having relatively large height H and width P are larger than counter vortexes formed by cooling fluid passing through the central side of the pair of opposing fins 210 that has relatively small height H and width P.

The size or the range of counter vortexes may be adjusted by adjusting the height H and the width P of the opposing fins 210 each having a trapezoidal column shape. For example, if the increase rate of the height H is increased or the increase rate of the width P is increased, the counter vortexes are more strongly generated. In contrast, if the increase rate of the height H is reduced or the increase rate of the width P is reduced, the counter vortexes are more lightly generated.

Referring FIG. 10A, a opposing fin 210 in accordance with an embodiment of the present disclosure may have a triangular plate shape that gradually increases in widthwise (P) cross-sectional area based on the flow direction of fluid. In this case, the height H of the triangular plate remains constant, and the width P thereof is gradually increased based on the flow direction of fluid.

The flow of cooling fluid discharged form the outlet of the gas hole 120 is disturbed by a first surface 211 of the opposing fin 210 having a triangular plate shape described above and is changed toward a second surface 213 so that the cooling fluid flows over the opposing fin 210. Thereafter, the cooling fluid flows downward behind a third surface 215, thus forming counter vortexes.

The size or the range of counter vortexes may be adjusted by adjusting the width P of the opposing fin 210 having a triangular plate shape. For example, if the increase rate of the width P is increased, the counter vortexes may be more strongly formed. In contrast, if the increase rate of the width P is reduced, the counter vortexes may be more lightly formed.

Referring FIG. 10B, the opposing fin 210 in accordance with an embodiment of the present disclosure may have a triangular plate shape that gradually increases in widthwise (P) and heightwise (H) cross-sectional area based on the flow direction of fluid. In this case, the height H and the width P of the triangular plate are gradually increased with respect to the flow direction of fluid.

The flow of cooling fluid discharged form the outlet of the gas hole 120 is disturbed by a first surface 211 of the opposing fin 210 having a triangular plate shape described above and is changed toward the second surface 213 so that the cooling fluid flows over the opposing fin 210. Thereafter, the cooling fluid flows downward behind a third surface 215, thus forming counter vortexes.

Here, a central portion of the opposing fin 210 having a triangular plate shape has a low height H so that the change of the flow of cooling fluid to the second surface 213 may be facilitated. Since the opposing fin 210 is inclined to increase the height H toward a third surface 215 of the opposing fin 210, the cooling fluid may smoothly flow on the second surface 213 and then enter the third surface 215.

The size or the range of counter vortexes may be adjusted by adjusting the height H and the width P of the opposing fin 210 having a triangular plate shape. For example, if the increase rate of the height H is increased or the increase rate of the width P is increased, the counter vortexes are more strongly generated. In contrast, if the increase rate of the height H is reduced or the increase rate of the width P is reduced, the counter vortexes are more lightly generated.

Referring to FIG. 10C, the opposing fin 210 in accordance with an embodiment of the present disclosure may have a triangular plate shape that gradually increases in widthwise (P) cross-sectional area based on the flow direction of fluid. A third surface 215 of the triangular plate may have a V shape with respect to the flow direction of fluid. In this case, the height H of the triangular plate remains constant, and the width P thereof is gradually increased based on the flow direction of fluid.

The flow of cooling fluid discharged form the outlet of the gas hole 120 is disturbed by a first surface 211 of the opposing fin 210 having a triangular plate shape described above and is changed toward the second surface 213 so that the cooling fluid flows over the opposing fin 210. Thereafter, the cooling fluid flows downward behind a third surface 215, thus forming counter vortexes.

Here, the third surface 215 may have a V shape to provide effects similar to that of a structure in which a pair of opposing fins 210 are disposed to be inclined to each other. In other words, due to interference between cooling fluids flowing over a pair of respective opposing fins 210, counter vortexes formed on the third surface 215 having a V shape are larger than that of the third surface 215 illustrated in FIGS. 10A and 10B.

Here, the size or the range of counter vortexes may be adjusted by adjusting the width P of the V shape of the third surface 215. For example, if the increase rate of the width P is increased, the counter vortexes may be more strongly formed. In contrast, if the increase rate of the width P is reduced, the counter vortexes may be more lightly formed.

Referring to FIG. 10D, the opposing fin 210 in accordance with an embodiment of the present disclosure may have a triangular plate shape that gradually increases in widthwise (P) and heightwise (H) cross-sectional area based on the flow direction of fluid. A third surface 215 of the triangular plate may have a V shape with respect to the flow direction of fluid. In this case, the height H and the width P of the triangular plate are gradually increased with respect to the flow direction of fluid.

The flow of cooling fluid discharged form the outlet of the gas hole 120 is disturbed by a first surface 211 of the opposing fin 210 having a triangular plate shape described above and is changed toward the second surface 213 so that the cooling fluid flows over the opposing fin 210. Thereafter, the cooling fluid flows downward behind the third surface 215, thus forming counter vortexes.

Here, a central portion of the opposing fin 210 having a triangular plate shape has a low height H so that the change of the flow of cooling fluid to the second surface 213 may be facilitated. Since the opposing fin 210 is inclined to increase the height H toward a third surface 215 of the opposing fin 210, the cooling fluid may smoothly flow on the second surface 213 and then enter the third surface 215.

Furthermore, the third surface 215 may have a V shape to provide effects similar to that of a structure in which a pair of opposing fins 210 are disposed to be inclined to each other. In other words, due to interference between cooling fluids flowing over a pair of respective opposing fins 210, counter vortexes formed on the third surface 215 having a V shape are larger than that of the third surface 215 illustrated in FIGS. 10A and 10B.

Here, the size or the range of counter vortexes may be adjusted by adjusting the height H and the width P of the V shape of the third surface 215. For example, if the increase rate of the height H is increased or the increase rate of the width P is increased, the counter vortexes are more strongly generated. In contrast, if the increase rate of the height H is reduced or the increase rate of the width P is reduced, the counter vortexes are more lightly generated.

Referring to FIG. 11A, the opposing fin 210 in accordance with an embodiment of the present disclosure may have a triangular plate shape that gradually increases in widthwise (P) cross-sectional area based on the flow direction of fluid. A second surface 213 of the triangular plate may have a V shape with respect to the vertical direction. A third surface 215 may have a V shape with respect to the flow direction of fluid. In this case, the height H of the triangular plate remains constant, and the width P thereof is gradually increased based on the flow direction of fluid.

The flow of cooling fluid discharged form the outlet of the gas hole 120 is disturbed by a first surface 211 of the opposing fin 210 having a triangular plate shape described above and is changed toward the second surface 213 so that the cooling fluid flows over the opposing fin 210. Thereafter, the cooling fluid flows downward behind the third surface 215, thus forming counter vortexes.

Here, the second surface 213 has a V shape, so that cooling fluid flowing over the first surface 211 formed on opposite sides of the triangular plate flows along the V shape of the second surface 213 in inclined directions in which cooling fluid is collected toward the central side with respect to the flow direction of fluid.

Furthermore, the third surface 215 may also have a V shape to provide effects similar to that of a structure in which a pair of opposing fins 210 are disposed to be inclined to each other. In other words, cooling fluid that flows on the second surface 213 in inclined directions in which the cooling fluid is collected toward the central side of the second surface 213 generates counter vortexes on the third surface 215.

Here, the size or the range of counter vortexes may be adjusted by adjusting the width P of the V shape of the second surface 213 or the third surface 215. For example, if the increase rate of the width P is increased, the counter vortexes may be more strongly formed. In contrast, if the increase rate of the width P is reduced, the counter vortexes may be more lightly formed.

Referring to FIG. 11B, the opposing fin 210 in accordance with an embodiment of the present disclosure may have a triangular plate shape that gradually increases in heightwise (H) and widthwise (P) cross-sectional area based on the flow direction of fluid. A second surface 213 of the triangular plate may have a V shape with respect to the vertical direction. A third surface 215 may have a V shape with respect to the flow direction of fluid. In this case, the height H and the width P of the triangular plate are gradually increased based on the flow direction of fluid.

The flow of cooling fluid discharged form the outlet of the gas hole 120 is disturbed by a first surface 211 of the opposing fin 210 having a triangular plate shape described above and is changed toward the second surface 213 so that the cooling fluid flows over the opposing fin 210. Thereafter, the cooling fluid flows downward behind the third surface 215, thus forming counter vortexes.

Here, the second surface 213 has a V shape, so that cooling fluid flowing over the first surface 211 formed on opposite sides of the triangular plate flows along the V shape of the second surface 213 in inclined directions in which cooling fluid is collected toward the central side with respect to the flow direction of fluid.

Furthermore, the third surface 215 may also have a V shape to provide effects similar to that of a structure in which a pair of opposing fins 210 are disposed to be inclined to each other. In other words, cooling fluid that flows on the second surface 213 in inclined directions in which the cooling fluid is collected toward the central side of the second surface 213 generates counter vortexes on the third surface 215.

Here, the size or the range of counter vortexes may be adjusted by adjusting the height H and the width P of the V shape of the second surface 213 or the third surface 215. For example, if the increase rate of the height H is increased or the increase rate of the width P is increased, the counter vortexes are more strongly generated. In contrast, if the increase rate of the height H is reduced or the increase rate of the width P is reduced, the counter vortexes are more lightly generated.

In accordance with the present disclosure, a vortex relief generator such as opposing fins is disposed on an inner periphery of a gas hole for discharging cooling fluid to cool the blade. Thus, counter vortexes opposite to vortexes generated by interaction between working fluid flowing along the surface of the blade and cooling fluid discharged from the gas hole are induced, whereby the vortexes generated by the interaction collide with the counter vortexes. This makes it possible for cooling fluid to smoothly flow on the surface of the blade, and increases diffusion effect. Consequently, the efficiency of cooling the surface of the blade may be enhanced.

Furthermore, the number of gas holes disposed on the surface of the blade may be reduced compared to that of the conventional technique. Hence, the stiffness of the blade may be enhanced, and the cost needed to form the gas holes may be reduced.

In the above descriptions, the specific embodiments of the sealing structure for the blade tip have been described. Therefore, it will be apparent to those skilled in the art that various changes and modifications may be made without departing from the spirit and scope of the disclosure as defined in the following claims.

What is claimed is:

1. A surface structure of a blade for a gas turbine in which interaction vortexes are generated between working fluid flowing along a surface of the blade and cooling fluid discharged onto the surface from an internal flow passage of the blade, the surface structure comprising:
   a gas hole having an outlet communicating with the surface of the blade to discharge the cooling fluid; and
   a vortex relief generator disposed so as to protrude from an inner periphery of the outlet and configured to generate counter vortexes having directionality opposite to the interaction vortexes so that the interaction vortexes are relieved by collision with the counter vortexes,
   wherein the vortex relief generator includes a fin disposed in a path of the cooling fluid, the fin including a first surface to change a flow direction of the cooling fluid,
   wherein the fin comprises a pair of opposing fins spaced apart from each other and disposed on the inner periphery of the outlet so as to face each other,
   wherein the pair of opposing fins are disposed on a lower surface of the outlet of the gas hole and are inclined in opposite directions relative to the flow direction of the cooling fluid, and
   wherein the pair of opposing fins are arranged obliquely so as to approach each other from a lower surface inside the outlet of the gas hole toward an upper surface inside the outlet of the gas hole.

2. The surface structure according to claim 1, wherein the plurality of opposing fins comprises a pair of opposing fins disposed such that a distance between the opposing fins gradually increases in a flow direction of the cooling fluid.

3. A surface structure of a blade for a has turbine in which interaction vortexes are generated between working fluid flowing along a surface of the blade and cooling fluid discharged onto the surface from an internal flow passage of the blade, the surface structure comprising:
   a gas hole having an outlet communicating with the surface of the blade to discharge the cooling fluid; and
   a vortex relief generator disposed so as to protrude from an inner periphery of the outlet and configured to generate counter vortexes having directionality opposite of the interaction vortexes so that the interaction cortexes are relieved by collision with the counter vortexes,
   wherein the vortex relief generator includes a fin disposed in a path of the cooling fluid, the fin including a first surface to change a flow direction of the cooling fluid,
   wherein the fin is disposed on an upper surface of the outlet of the gas hole,
   wherein the fin comprises a pair of opposing fins spaced apart from each other and disposed on the inner periphery of the outlet so as to face each other, and each of the pair of opposing fins has a height measured from the inner periphery that increases in a flow direction of the cooling fluid, and
   wherein the pair of opposing fins are arranged obliquely so as to approach each other relative to the flow direction of the cooling fluid at the upper surface inside the outlet of the gas hole.

4. A surface structure of a blade for a gas turbine in which interaction vortexes are generated between working fluid flowing along a surface of the blade and cooling fluid discharged onto the surface from an internal flow passage of the blade, the surface structure comprising:
   a gas hole having an outlet communicating with the surface of the blade to discharge the cooling fluid; and
   a vortex relief generator disposed so as to protrude from an inner periphery of the outlet and configured to generate counter cortexes having directionality opposite to the interaction vortexes so that the interaction vortexes are relieved by collision with the counter vortexes,
   wherein the vortex relief generator includes a fin disposed in a path of the cooling fluid, the fin including a first surface to change a flow direction of the cooling fluid,
   wherein the fin includes opposing triangular plates having a cross section of a predetermined width that gradually increases in a flow direction of the cooling fluid, and the opposing triangular plates maintains a constant height along the flow direction of the cooling fluid.

5. A surface structure of a blade for a gas turbine in which interaction vortexes are generated between working fluid flowing along a surface of the blade and cooling fluid discharged onto the surface from an internal flow passage of the blade, the surface structure comprising:
   a gas hole having an outlet communicating with the surface of the blade to discharge the cooling fluid; and
   a vortex relief generator disposed so as to protrude from an inner periphery of the outlet and configured to generate counter vortexes having directionality opposite to the interaction vortexes so that the interaction vortexes are relieved by collision with the counter vortexes,
   wherein the vortex relief generator includes a fin disposed in a path of the cooling fluid, the fin including a first surface to change a flow direction of the cooling fluid,
   wherein the fin includes opposing triangular plates having a cross section of a predetermined height that gradually increases in a flow direction of the cooling fluid,
   wherein the opposing triangular plates includes a second surface disposed opposite to the inner periphery of the outlet and having a V-shape, and a third surface disposed opposite to the inner periphery of the outlet and having a V-shape.

6. The surface structure according to claim 4, wherein the opposing triangular plates includes a second surface that is disposed opposite the inner periphery of the outlet and has a V shape.

7. The surface structure according to claim 4, wherein the opposing triangular plates include a third surface that is disposed on a downstream side of the fin and has a V shape.

* * * * *